United States Patent [19]

Pomatto, Sr.

[11] Patent Number: 4,660,192

[45] Date of Patent: Apr. 21, 1987

[54] SIMULTANEOUS AM AND FM TRANSMITTER AND RECEIVER

[76] Inventor: Robert P. Pomatto, Sr., 4189 S. 300 West #76, Ogden, Utah 84405

[21] Appl. No.: 722,044

[22] Filed: Apr. 11, 1985

[51] Int. Cl.⁴ ............................................. H04J 9/00
[52] U.S. Cl. ...................................... 370/11; 455/61; 455/102; 370/12; 370/69.1
[58] Field of Search .................. 455/61, 102; 370/11, 370/12, 69.1, 122

[56] References Cited

U.S. PATENT DOCUMENTS

| | | | |
|---|---|---|---|
| 2,810,782 | 10/1957 | Hester | 370/69.1 |
| 3,032,717 | 5/1962 | Fowler et al. | 370/11 |
| 3,188,573 | 6/1965 | Nestlerode | 370/11 |
| 3,206,680 | 9/1965 | Mason . | |
| 3,378,773 | 4/1968 | Jeffers . | |
| 3,623,105 | 11/1971 | Kamen | 370/11 |
| 3,665,507 | 5/1972 | Pell . | |
| 3,745,467 | 7/1973 | Lundquist et al. . | |
| 3,919,645 | 11/1975 | Ohsawa et al. . | |
| 3,971,988 | 7/1976 | Denenberg . | |
| 4,001,702 | 1/1977 | Kaufman | 329/135 |
| 4,070,628 | 1/1978 | Funabashi . | |
| 4,079,204 | 3/1978 | Takahashi et al. | 455/102 |
| 4,304,004 | 12/1981 | von der Neyen | 375/88 |
| 4,310,920 | 1/1982 | Hayes | 370/11 |

Primary Examiner—Jin F. Ng
Assistant Examiner—Elissa Seidenglanz
Attorney, Agent, or Firm—William G. Auton; Donald J. Singer

[57] ABSTRACT

A process and apparatus for simultaneously broadcasting a first intelligence signal with a plurality of second intelligence signals is disclosed. The transmitter performs the following steps: multiplexing the plurality of second intelligence signals into a single signal to form a first modulating signal; frequency modulating a first radio frequency carrier signal with the first modulating signal to form a second radio frequency carrier signal; amplitude modulating the second radio frequency carrier signal using the first intelligence signal as a second modulating signal; and broadcasting the resultant single radio frequency signal out over a transmitting antenna. The receiver performs the following steps: after receiving the single radio frequency signal over a receiving antenna, it amplitude-demodulates the single radio frequency signal to yield the first intelligence signal, and the second radio frequency carrier signal; by frequency-demodulating the second radio frequency carrier signal, the first modulating signal is yielded; and by demultiplexing the first modulating signal, the plurality of second intelligence signals is yielded.

5 Claims, 12 Drawing Figures

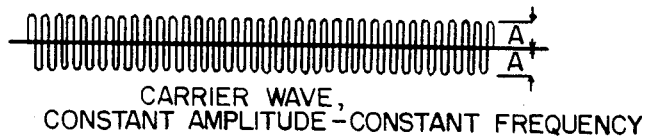
FIG. 2A PRIOR ART
CARRIER WAVE, CONSTANT AMPLITUDE-CONSTANT FREQUENCY
FIG. 2B PRIOR ART
SIGNAL, OR MODULATING WAVE
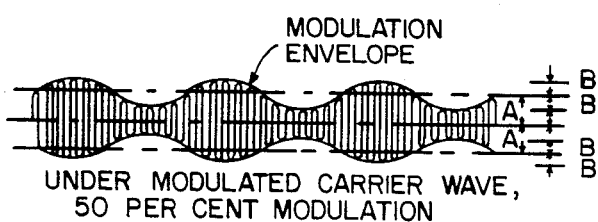
FIG. 2C PRIOR ART
UNDER MODULATED CARRIER WAVE, 50 PER CENT MODULATION
FIG. 2D PRIOR ART
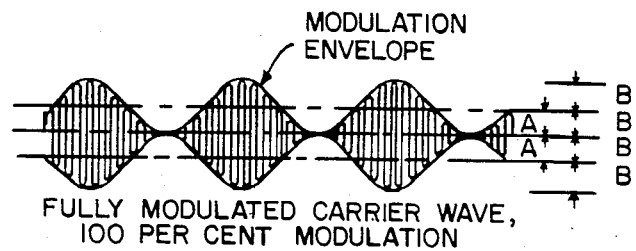
FULLY MODULATED CARRIER WAVE, 100 PER CENT MODULATION
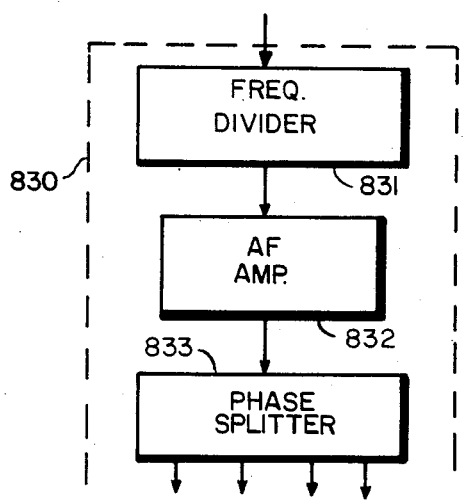
FIG. 8

SIMULTANEOUS AM AND FM TRANSMITTER AND RECEIVER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to AM-FM modulation and demodulation systems and specifically communication system with a gated Amplitude-Frequency (AM/FM) transmitter and an AM/FM receiver.

Due to the many growing uses of radio communication channels, there exists a shortage of channels in the radio frequency spectrum. An alternative to using multiple radio frequency carriers is the communication system of the present invention, which can transmit and receive, either alternatively or simultaneously, the same or different signals on one radio resulting in the availability of two separate channels of information (one AM and one FM) on the same carrier.

The task of providing a communication system capable of using two separate channels of information (one AM and one FM) on the same carrier has been alleviated, to some degree, by the prior art devices of the following U.S. patents:

U.S. Pat. No. 3,378,773 issued to Jeffers;
U.S. Pat. No. 4,310,920 issued to Hayes;
U.S. Pat. No. 4,001,702 issued to Kaufman;
U.S. Pat. No. 4,070,628 issued to Funabashi;
U.S. Pat. No. 4,304,004 issued to von der Neyen;
U.S. Pat. No. 3,206,680 issued to Mason;
U.S. Pat. No. 3,665,507 issued to Peil;
U.S. Pat. No. 3,745,467 issued to Lundquist et al;
U.S. Pat. No. 3,919,645 issued to Ohsawa et al; and
U.S. Pat. No. 3,971,988 issued to Denenberg.

Radio receivers possessing both AM and FM reception are very common, especially in the automotive field. The Kaufman, Funabashi, von der Neyen, Mason, Peil, Lundquist et al, Ohsawa et al and Denenberg patents, which are incorporated herein by reference are all radio receivers capable of receiving AM and FM. However, most automotive radio receivers, such as the one of Funabashi, Mason, Peil, Lundquist et al, Ohsawa et al, and Denenberg receive AM and FM signals as alternatives; that is, they allow the user to select between reception of AM and FM signals.

What is desired is a communication system which allows simultaneous reception and simultaneous use of AM and FM channels on the same RF carrier.

The Kaufman disclosure does, in fact, simultaneously demodulate both the AM and FM signals. However, in this patent, the demodulated AM signal is used to squelch the FM demodulated data channel when noise or interference reaches a predetermined level. Similarly, von der Neyen's apparatus for transmission and reception of frequency modulated digital communication signals includes a blockable phase follow-up device for compensating for large differences between AM and FM demodulation products.

Both Kaufman and von der Neyen recognize that, theoretically, received FM signals have no AM components, so if there is no noise and if there is no interference, the output of the AM part of the demodulator is constant DC voltage. However, all the prior art radio receivers recognize the importance of avoiding interference between AM and FM signals, and the devices of Kaufman and von der Neyen are particularly tailored to eliminate such interference.

The radio receiver of the present invention differs from the prior art devices in both structure and intent. The present receiver demodulates AM and FM simultaneously to provide two separate channels of information (one AM and one FM) for simultaneous use from the same RF carrier.

Radio transmitters capable of transmitting both AM and FM are rare compared to the number of receivers patented. The Jeffers and Hayes patents incorporated herein by reference, are for radio transmitters capable of transmitting both AM and FM.

The transmitter of the present invention differs in structure and method of signal processing from the prior art devices of both Jeffers and Hayes. The transmitter of the present invention simultaneously amplitude modulates one input signal and frequency modulates a second input signal by first accomplishing frequency modulation on the first input signal. The carrier is then amplified, and the amplitude modulated by either the same, or a second input signal and transmitted.

In view of the foregoing discussion it is apparent that there currently exists the need for a communication system with the capability of transmission and reception of two separate channels of information (one AM and one FM) for simultaneous use on the same RF carrier. The present invention is directed towards satisfying that need.

SUMMARY OF THE INVENTION

The present invention is a communication system having a gated Amplitude-Frequency (AM/FM) transmitter and an (AM/FM) receiver. The transmitter is capable of simultaneously amplitude modulating (AM) and frequency modulating (FM) separate intelligence channels on one radio frequency (RF) carrier. In one embodiment of the invention, the AM modulating signal is used to trigger a plurality of FM intelligence sources, so that their signals are sequentially multiplexed into a master FM modulating signal. The master FM modulating signal frequency-modulates a carrier from a radio frequency oscillator to form a frequency-modulated carrier. The frequency-modulated carrier is then amplitude modulated using the AM modulating signal to produce the simultaneously AM and FM intelligence channels on one radio frequency carrier.

The receiver is capable of demodulating AM and FM simultaneously. The result is two separate channels of information (one AM and one FM) are available on the same RF carrier.

It is a principal object of the present invention to provide a new and improved radio communication system.

It is another object of the present invention to provide a communication system providing the availability of two separate channels of information on the same RF carrier.

It is another object of the present invention to provide a gated transmitter capable of simultaneously amplitude modulating and transmitting one input signal and frequency modulating and transmitting the same or a second input signal on the same RF carrier.

It is another object of the present invention to provide a radio receiver, which allows simultaneous reception and simultaneous use of the AM and FM channels on the same RF carrier.

These together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 2a is a sketch of a constant amplitude-constant frequency carrier wave;

FIG. 2b is a sketch of a modulating wave;

FIG. 2c is a sketch of the carrier wave of FIG. 2a after being amplitude modulated by the modulating wave of FIG. 2b at about 50% modulation;

FIG. 2d is a sketch of an amplitude modulated carrier wave at 100% modulation;

FIG. 8 is a sketch of a circuit that can be used as a part of the transmitter of FIG. 5 and the receiver of FIG. 7.

DETAILED DESCRIPTION OF THE PREFERRED EMBODIMENT

The present invention is a communication system having a gated AM/FM transmitter and an AM/FM simulcast receiver capable of simultaneously communicating two separate channels of information (one AM and one FM) for simultaneous use on the same RF carrier.

Figure 1:
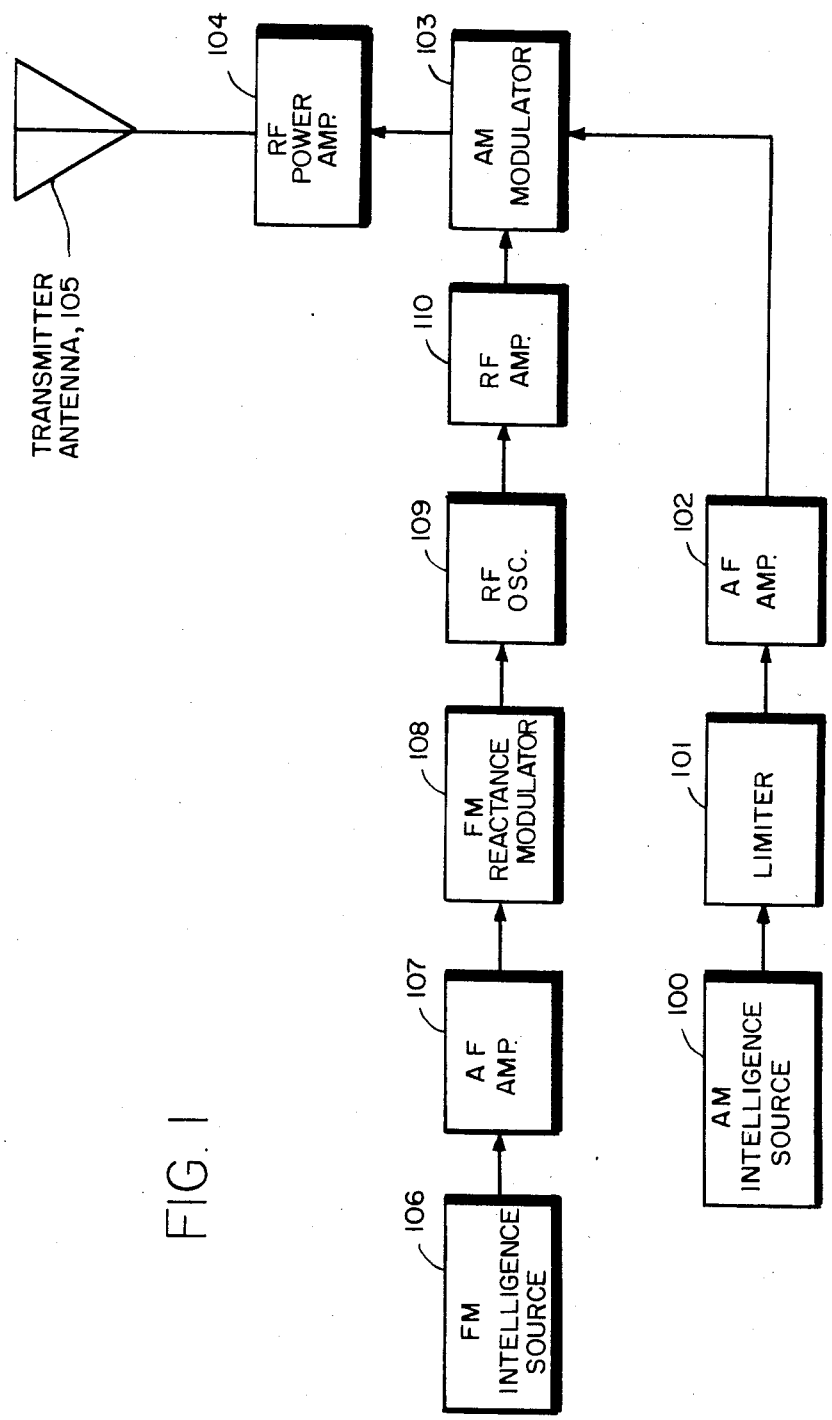
FIG. 1 is a sketch of the AM/FM transmitter of the present invention.

FIG. 1 is an illustration of a block diagram of the AM/FM transmitter of the present invention. The AM Intelligence Source 100 is the device which inputs the signal which will be transmitted in AM. It may be a microphone conducting audible signals of 20–15,000 Hz, a digital signal source, or even a low-frequency oscillator.

The limiter 101 takes the signal produced by the AM Intelligence Source 100, and produces a square wave AM modulating signal, which is amplified by the first Audio Frequency amplifier, and input into the AM modulator 103. Note that this limiter 101 is not used when the AM intelligence source is a voice signal, since it would clip the peaks of the signal and produce an unwanted distortion. Therefore whenever the transmitter amplitude modulates a voice signal, the limiter 101 in FIGS. 1, 3, 4, and 5a are omitted. However, if the AM intelligence source is an oscillator and the intent is to produce a square wave controlling signal, which is used to control a remote device, the limiter 101 is used to form the desired square-wave from the undesired sinesoidal wave produced by the oscillator.

The AM intelligence source 100 and the limiter 101 are probably best conceptualized as a microphone means. When the microphone means is intended to produce a square-wave control signal, the AM intelligence source 100 can be a low-frequency oscillator which produces a signal which is transformed into the desired square wave by the limiter 101. When the microphone means is intended to produce an audio signal, the microphone means is simply a microphone, or similar electrical device, and the limiter is not used.

The invention, as described so far, resembles a conventional AM radio transmitter which performs modulation: the process of combining audio frequency (AF) with radio frequency (RF). The ordinary AM modulator performs modulation using two input signals: the modulating signal (which contains the desired audio signal); and a carrier wave, produced by an RF oscillator.

The carrier wave, e, may be expressed as shown by Equation 1:

$$e = E_m \sin(2\pi f(t) + \theta) \qquad (1)$$

In conventional radio, the carrier wave is modulated by varying one of 3 factors of the carrier wave by the modulating signal. In amplitude modulation (AM), the factor $E_m$ of the carrier is varied with the modulating signal. In frequency modulation (FM), the factor f is varied with the modulating signal. In phase modulation, the phase $\theta$ is varied with the modulating signal.

The present invention differs from a conventional AM radio transmitter in that transmission of a carrier signal which is both AM and FM modulated is performed by the AM modulator 103. The technique of the present invention is to treat the FM signal as the carrier wave and perform AM modulation on it. The FM Intelligence Source 106 is the device which inputs the signal which will be FM modulated. It is similar to the AM Intelligence source in that it may be microphone or a digital signal source.

The second Audio Frequency Amplifier 107 amplifies; the signal, which is then used by the FM modulator 108 to frequency modulate the carrier signal from the RF oscillator 109. The RF amplifier 110 differs from both the Audio Amplifiers 102 and 107, in that it is designed to increase the amplitude of signals at radio frequencies.

The amplified FM modulated signal is then treated as a carrier wave, and AM modulated by the AM modulator 103. The RF power amplifier 104 amplifies the RF signal for transmission of the signal over the transmitter antenna 105.

The AM modulator 103 has a particular design characteristic which allows the signal from the Am Intelligence Source 100 to be successfully used as a modulating signal, yet not cut off the flow of information from the FM Intelligence Source when the AM modulating signal is zero. This design characteristic is best illustrated in the following discussion on FIGS. 2(a) –2(e).

FIGS. 2(a)–2(e) illustrate waveforms of a carrier wave that is amplitude-modulated by a sine wave signal. FIG. 2(a) is a sketch of a standard carrier wave, which has a constant amplitude A, where A is measured in volts.

FIG. 2(b) is a sketch of a sinusoidal modulating wave having an amplitude B, where B is measured in volts.

FIG. 2(c) is a sketch of a carrier wave of FIG. 2(a) as modulated by the modulating signal of FIG. 2(b) at 50% modulation. The percent of modulation M is given by the following equation:

$$M = B/A \times 100 = \% \text{ of modulation,} \qquad (2)$$

where

B is the maximum value of the modulating wave, and A is the maximum value of the carrier wave.

FIG. 2(d) is a sketch of the carrier wave of FIG. 2(a) as modulated by the modulating signal of FIG. 2(b) at 100% modulation. The modulated wave of FIG. 2(d) is zero where the amplitude of the modulating wave is zero.

FIGS. 2(a)-2(d) indicate that the AM modulator 103 as used in FIG. 1 must use a percent of modulation that is less than 100% to avoid "cutting off" the signals from the FM Intelligence Source 106 when there are breaks in the AM modulating signal. Therefore, an AM modulator that has a modulation rate of about 50% is acceptable for use as the AM modulator 103 of the present invention.

Figure 3:
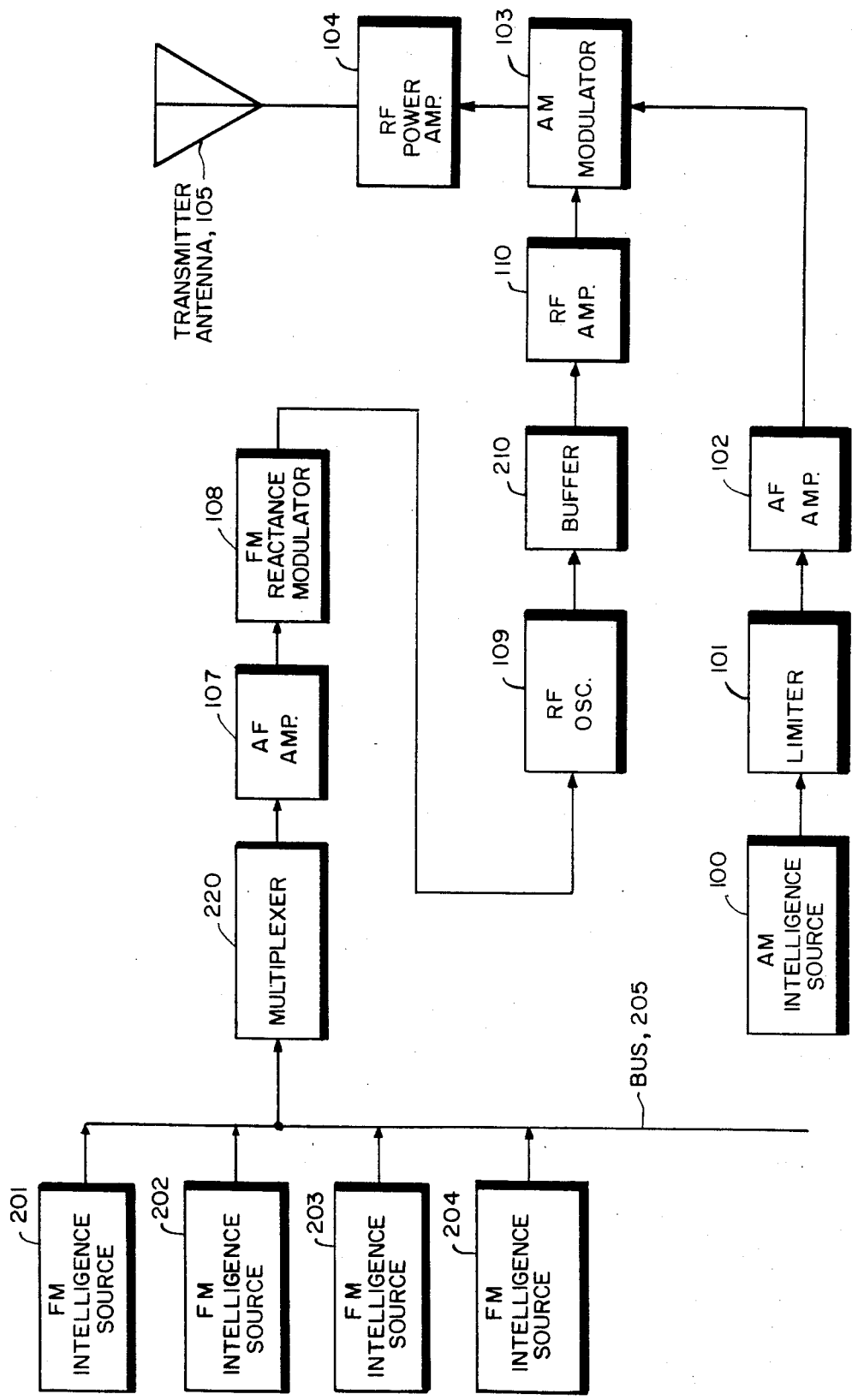
FIGS. 3 and 4 are block diagrams of other embodiments of AM/FM transmitters of the present invention.

FIG. 3 is an alternate embodiment of the simulcast transmitter of the present invention. All like enumerated elements are as described in FIG. 1 in this and all succeeding figures. However, the transmitter of FIG. 3 adds a simulcast means, to transmit the AM signal with signals from a plurality of FM Intelligence sources 201-204.

The simulcast means added to the invention consists of a bus 205, a multiplexer 220, and a buffer 210. Bus 205 conducts the FM signals into a multiplexer 220 which transmits the plurality of FM signals over a single path to AF amplifier 107. Buffer 210 was also added to insure any required signal separation is maintained so that none of the FM information is lost.

Figure 4:
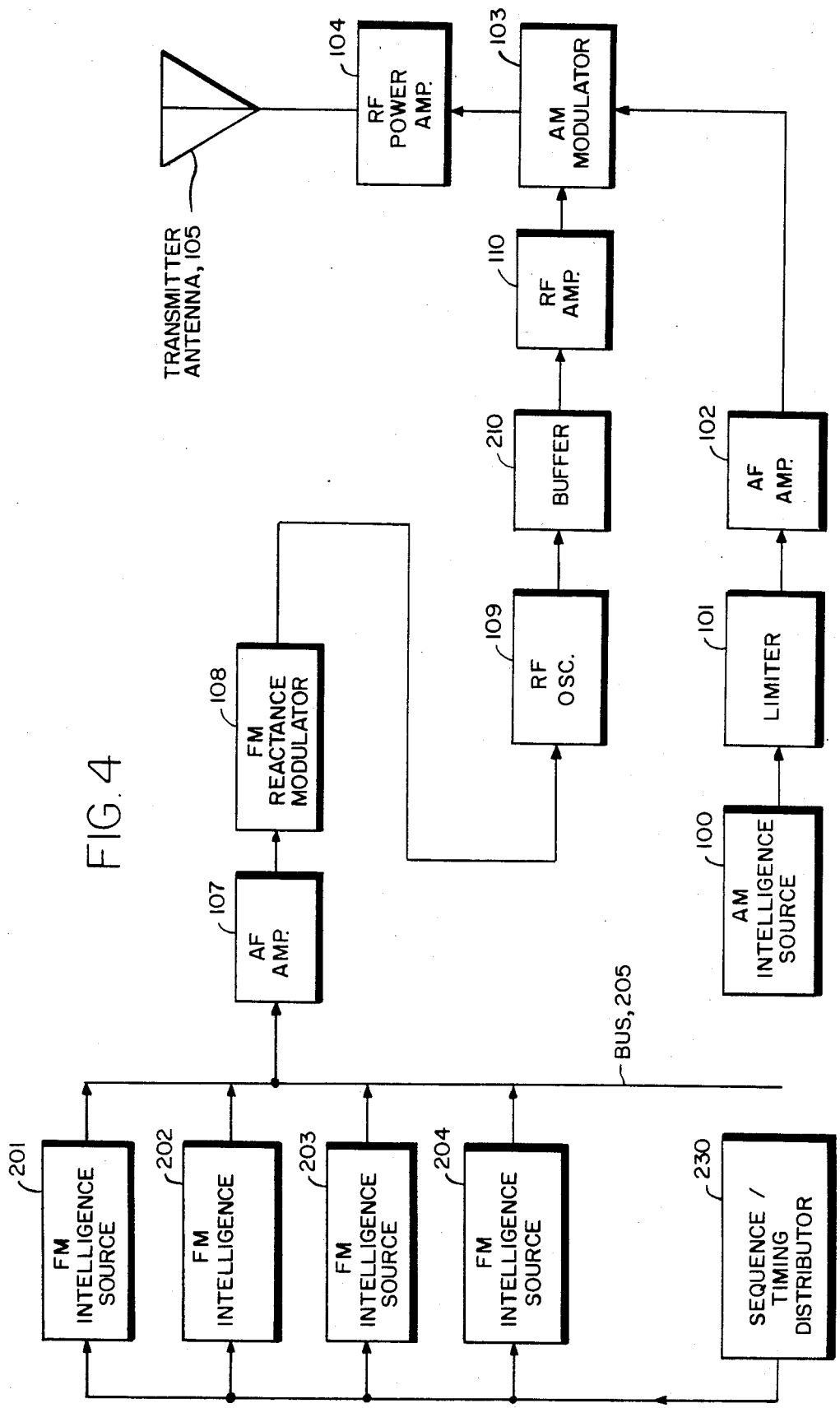

FIG. 4 is a block diagram of another embodiment of the transmitter which uses a transmission means to combine signals from the plurality of FM Intelligence sources 201-204. However, instead of combining all the FM signals after they leave the FM Intelligence Sources 201-204, the simulcast means of FIG. 4 employs a sequence timing distributor 230, which only allows the FM Intelligence sources to transmit during any amount of time allotted to them. A detailed example of this sequence timing distributor is given in the embodiment of the transmitter as illustrated in FIG. 5.

Figure 5A:
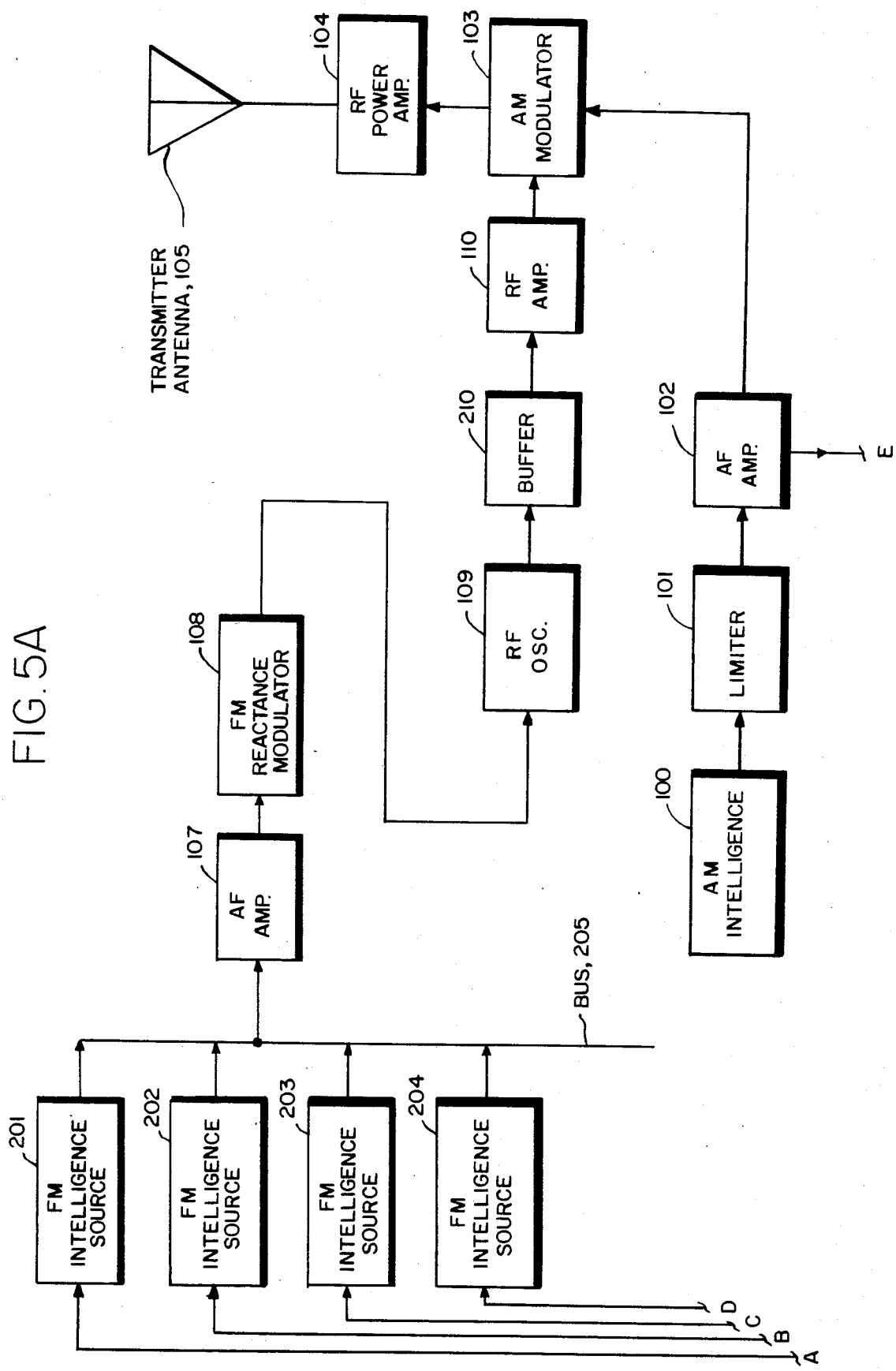
FIGS. 5a and 5b are two sketches that can be combined to represent a block diagram of the preferred embodiment of the AM/FM simulcast of the present invention.
Figure 5B:
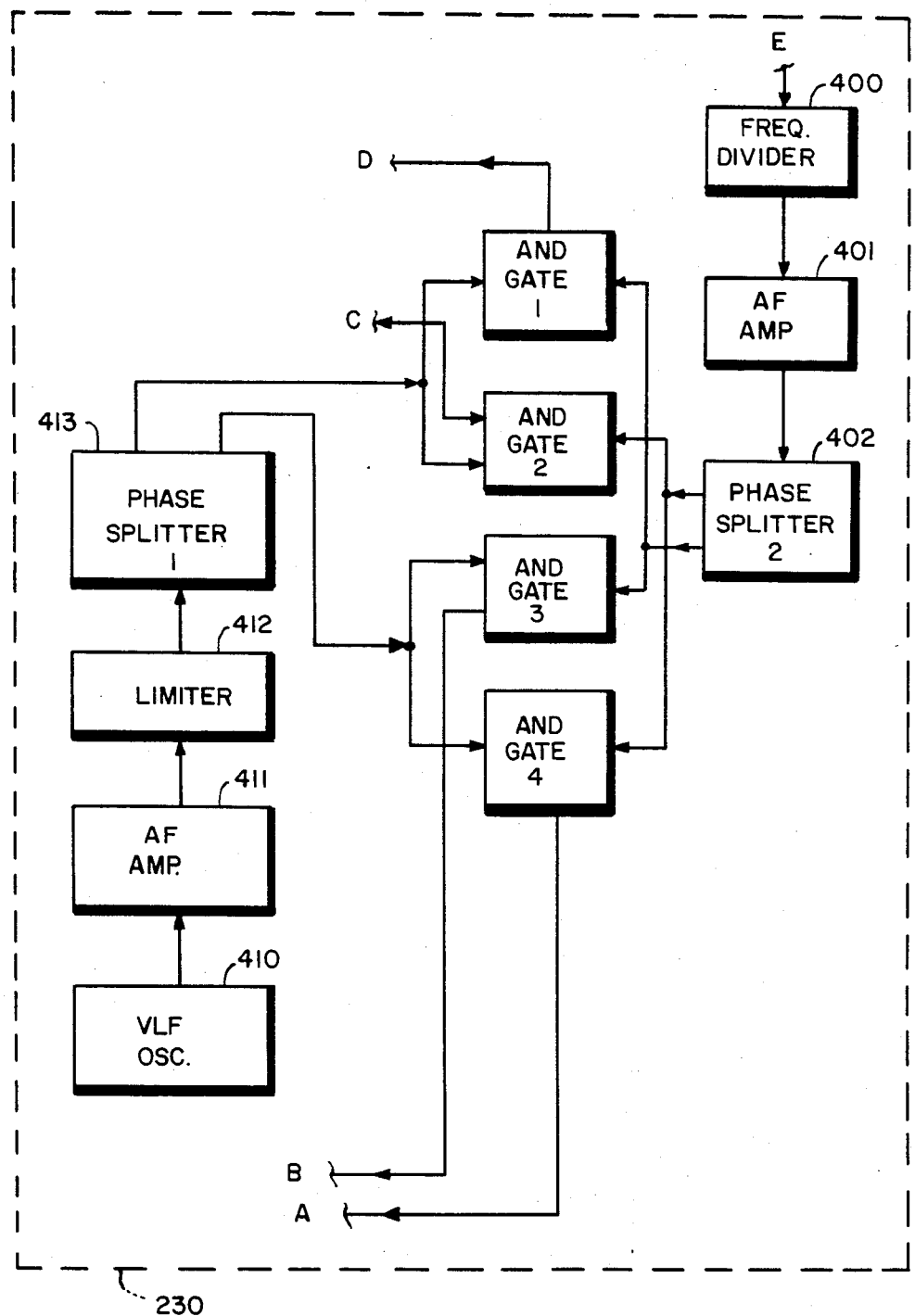

FIGS. 5a and 5b can be combined to form a single figure, which will be referred to as "FIG. 5". FIG. 5 is a block diagram of the transmitter used in the preferred embodiment of the present invention. The sequence timing distributor 230 uses the AM modulating signal from the AF amplifier 102 to produce the sequence timing signal that allows the FM Intelligence Sources 201 and 204 to transmit during the amount of any time allotted to them.

The AM modulating signal from the AF amplifier 102 is processed by a frequency divider 400, which divides the AM modulating signal in half. The AF amplifier 401 is provided to provide the divided signal from the frequency divider 400 with any gain that was lost.

The phase splitter 402 receives the amplified divided AM modulating signal from AF amplifier 401 and produces two output signals which are each 180° out of phase with each other.

The four AND gates 1-4 produce the four sequence and timing signals to the FM Intelligence Sources 201-204. AND gates 1 and 3 receive the first output signal from the phase splitter 402, and AND gates 2 and 4 receive the second output signal.

The sequence timing distributor 230 also contains a very low frequency (VLF) oscillator 410 which produces a clocking signal synchronized with, and at one fourth the frequency of, the AM modulating signal from AF amplifier 102.

The AF amplifier 411 amplifies the signal from the VLF oscillator 410, and sends it to the limiter 412, which produces a square wave output.

The phase splitter 413 receives the square wave output from the limiter 412 and produces two outputs which are each 180° out of phase with each other. The first output signal from limiter 412 is input into AND gates 1 and 2, and the second output signal in input into AND gates 3 and 4.

The sequence timing distributor 230 as described above functions as follows: when AND gate 1 produces an output, its corresponding FM Intelligence source 204 produces an FM modulating signal. When AND gate 1 no longer produces an output, its corresponding FM Intelligence source 204 is off, and a preceeding AND gate and FM Intelligence source is activated. By multiplexing multiple FM modulating signals together, they may be transmitted with the AM modulating signal by the present invention.

Figure 6:
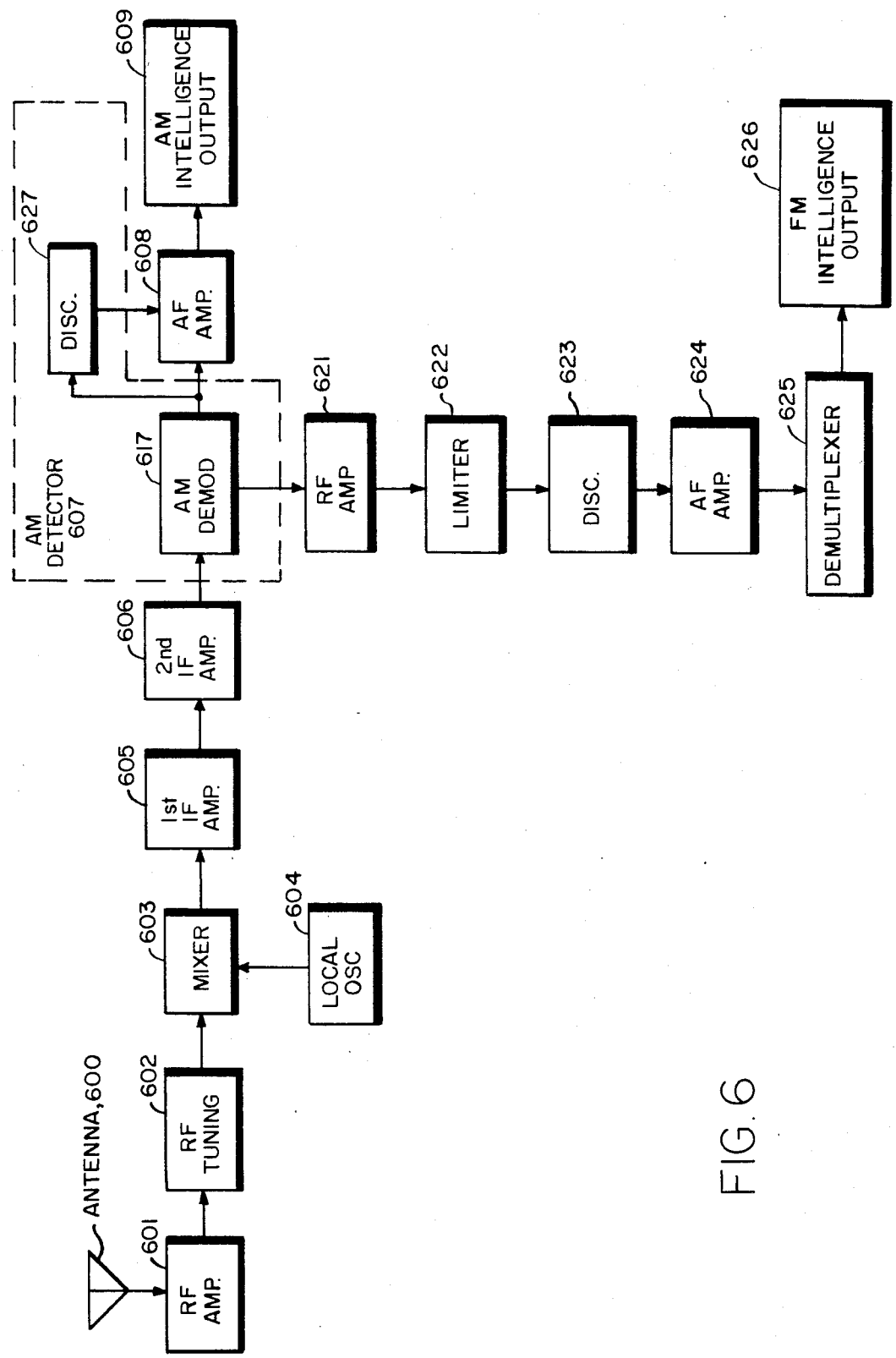
FIGS. 6 and 7 are block diagrams of alternative embodiments of the AM/FM simulcast receiver of the present invention.

FIG. 6 is a block diagram of the AM/FM simulcast receiver of the present invention. The embodiment of the receiver in FIG. 6 is designed to demodulate and separate the AM and FM radio signals which contain only one FM intelligence signal modulated with the AM modulating signal, such as shown by the transmitter of FIG. 1.

The receiver receives simulcast RF signals over receiver antenna 600, and amplified by RF amplifier 601. The receiver may be tuned to the desired frequency using the RF tuner 602. A mixer 603 and local oscillator 604 convert the received RF signal into an intermediate frequency (IF). The intermediate frequency signal is then amplified by a first and second IF amplifier 605 and 606.

At this point, it is important to note that both IF amplifiers 605 and 606 as well as the mixer 603, tuner 602, and local oscillator 604 can be eliminated if only one signal is expected to be received over RF. The use of IF conversion and amplification provides greater selectivity, sensitivity, stability and fidelity since the IF amplifier operates at a fixed frequency (as opposed to the use of just an RF amplifier 601 which must operate over the entire frequency range of the receiver). Therefore, if several frequencies operated by different transmitters are to be received by the receiver, then RF tuning as well as the mixer 603, local oscillator 604 and IF amplifiers 605 and 606 should be including to enhance to the receiver's selectivity and sensitivity.

The AM detector 607 demodulates the AM modulating signal which is amplified by an AF amplifier 608 and sent to the AM Intelligence output 609. The AM Intelligence output 609 is simply any receiving device (such as a speaker) which corresponds to the AM Intelligence Source 100 (such as a microphone). The AM detector 607 separates the AM modulating signal from the RF carrier signal. The AM detector 607 of FIG. 6 may be either a conventional AM demodulator 617 or an AM demodulator 617 connected in series with an FM demodulator 627, depending upon the use made of the AM intelligence signal. When the AM intelligence signal is not intended to be used, the AM detector 607 is simply a conventional AM demodulator 617 such as disclosed in the above-cited references of Kaufman, Funabaski, von der Neyen, Mason, Peil and Denenberg. An example in which the AM intelligence signal is not intended for use is the case in which the AM intelligence source 100 of the transmitter is simply an oscillator whose product is used by the AM modulator 103 to modulate received signals.

When the AM intelligence signal is intended for use, the AM detector 607 is an AM demodulator 617 which is connected with a conventional FM demodulator 627. The AM detector 607 always extracts an AM modulator signal and an RF carrier signal from received signals. In FIG. 6, the RF carrier signal is routed to the RF amlifier 621 and the AM modulator signal is forwarded to the AF amplifier 608. If the AM intelligence signal is intended for use, the contaminated AM modulator signal from the AM modulator 617 is cleansed from any effects of frequency modulation by a conventional FM demodulator 627, and forwarded to the AF amplifier 608. Therefore, for the purposes of this invention, the term "AM detector" should be considered as an AM demodulator connected with an FM demodulator. However, the RF carrier signal still retains information from the FM Intelligence Source 106 of the transmitter. Therefore, rather than discarding the RF carrier, it is processed in an FM demodulation loop 621–626.

The RF amplifier 621 amplifies the RF carrier which is then processed by the limiter 622 to produce a square wave output. The output of the limiter 622 is then processed by the FM discriminator 623 to obtain the FM intelligence signal. The FM discriminators 623 and 627 can be any conventional FM demodulator such as the examples disclosed in the above-cited references of Kaufman, Funabashi, von der Neyen, Mason, Peil, Denenberg and Ohsawa et al. The FM intelligence signal is then amplified by AF amplifier 624 and sent to the FM Intelligence output 626.

The FM Intelligence output 626 is simply a receiving device (such as a speaker) which corresponds to the FM Intelligence Source 106 of FIG. 1 (which could be a microphone). The FM Intelligence inputs outputs are, of course, not limited to devices which process audible sound; but may also be sources of digital signals rather than the microphone/speaker examples disclosed above.

If the FM intelligence signal is actually a combination of a plurality of intelligence signals which were multiplexed into a single signal by the multiplexer 220 of FIG. 3; the receiver of FIG. 6 contains a demultiplexer 625 which serves to divide the FM intelligence signals back into the plurality of intelligence signals before it is sent to the FM Intelligence output 626.

Figure 7:
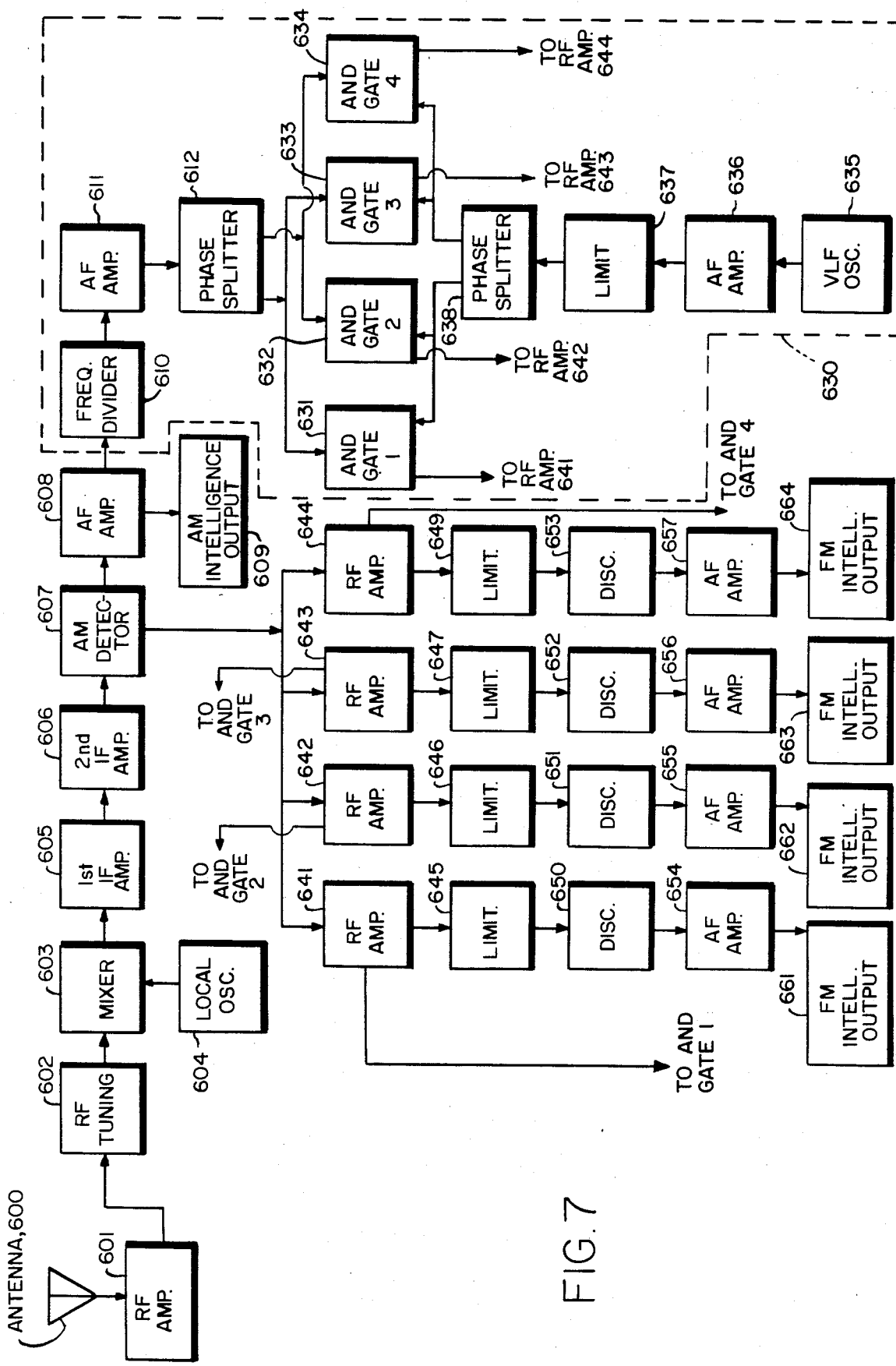

FIG. 7 is a block diagram of another embodiment of the gated AM/FM receiver of the present invention. The embodiment depicted in FIG. 7 is designed to demodulate the AM and FM radio signals received, and to separate four multiplexed FM modulating signals such as those generated by the four FM Intelligence Sources 201-204 of FIG. 5.

The elements of FIG. 7 correspond to like enumerated elements in FIG. 6, and need not be re-described. FIG. 7 contains additional element since the AM modulating signal of the receiver of FIG. 7 has two purposes. First, it carries the information input into it by the AM Intelligence Source 100 of FIG. 5. Secondly, the AM modulating signal may be used to demultiplex the plurality of FM intelligence signals in the receiver of FIG. 7, just as it was used to multiplex the FM modulator signals in the transmitter of FIG. 5. Accordingly, one destination of the amplified modulating signal of AF amplifier 608 is the AM Intelligence output 609. The AM intelligence output 609 is simply any receiving device (such as a speaker) that corresponds to the AM Intelligence source 100 (such as a microphone) which was used in the transmitter of FIG. 5.

The second destination of the amplified modulating signal of AF amplifier 608 is a demultiplexing means 630. The demultiplexing means 630 in FIG. 6 is a circuit with a configuration which is identical with that of the sequence and timing distributor 230 found in FIG. 5.

Demultiplexing begins with the Frequency divider 610, which divides the amplified AM modulating signal in half. After amplification by the AF amplifier 611, the phase splitter 612 produces two output signals which are each 180° out of phase with each other. The first output goes to AND gates 631 and 633, and the second to AND gates 632 and 634.

The four AND gates 631-634 produce four sequence and timing signals to selectively enable the four separate RF amplifiers 641-644 so that the four separate FM intelligence signals can be separated out into their own separate FM demodulator paths 641-664.

The demultiplexing means 630 also contains a VLF oscillator 635, AF amplifier 636, limiter 637 and phase splitter 638 which correspond with elements 410-413 in the transmitter of FIG. 5. The signals phase splitters 638 and 612 are intended to produce inputs which cause the four AND gates 631-634 to sequentially produce an enabling pulse at one fourth the frequency of the AM modulating signal, with each pulse separated by 90° in phase from each other.

In an alternative embodiment of both the transmitter of FIG. 5 and the receiver of FIG. 7, the demultiplexing means 630, of the receiver, as well as the sequence and timing generator 230 can be replaced by the circuit 830 of FIG. 8.

The device of circuit 830 receives the AM modulating signal employs a frequency divider 831 that produces an output signal at ¼ the frequency of the AM modulating signal. The AF amplifier 832 amplifies the signal from the frequency divider which is then sent to the phase splitter 833. The phase splitter 833 simply produces four pulsed outputs at ¼ the frequency of the AM modulating signal and which are separated from each other by 90° in phase.

Returning to FIG. 7, the purpose of the demultiplexing means is to provide a selective enabling to four separate FM demodulation paths 641-664 so that the separate FM intelligence signals are separated from each other. Note that each individual FM demodulation path functions as described for elements 621-625 of FIG. 6.

A simulcast receiver which follows the pattern established by FIG. 7, is capable of receiving a plurality of separate FM signals which are transmitted with the single AM signal.

While the invention has been been described in its presently preferred embodiment it is understood that the words which have been used are words of description rather than words of limitation and that changes within the purview of the appended claims may be made without departing from the scope and spirit of the invention in its broader aspects.

What is claimed is:

1. A radio communication system having an AM/FM transmitter capable of transmitting a first intelligence signal with a plurality of second intelligence signals simultaneously over a single radio frequency, said AM/FM transmitter comprising:

a plurality of electrical signal sources each producing one of said second intelligence signals to be transmitted over said radio communication system;

a multiplexer means producing an output signal by receiving and multiplexing said second intelligence signals from said plurality of electrical signal sources;

a bus conducting all signals from said plurality of electrical signal sources to said multiplexer means;

an AM intelligence source which outputs said first intelligence signal;

an amplitude-modulation means receiving said output signal from said multiplexer means, and first intelligence signal from said AM intelligence source, said amplitude-modulation means producing an AM/FM signal by receiving and using said first intelligence signal to amplitude-modulate said frequency-modulated carrier signal; and a transmitter means transmitting said AM/FM signal from said amplitude-modulation means, said transmitter means thereby transmitting said first and said plurality of second intelligence signals simultaneously over a single radio frequency.

2. A radio communication system having an AM/FM transmitter capable of transmitting a first and a plurality of second intelligence signals simultaneously over a single radio frequency, said AM/FM transmitter comprising:

a first microphone means receiving and converting said first intelligence signal into a first set of electrical impulses;

a first audio frequency amplifier producing an AM modulating signal by receiving and amplifying said set of electrical inpulses from said first microphone means;

a plurality of electrical signal sources, including a second microphone means, which receives and converts said plurality of second intelligence signals into a second set of electrical impulses, said plurality of electrical signal sources each producing an output when receiving an enabling pulse;

a sequence and timing distributor means sending a plurality of enabling pulses to said plurality of electrical signal sources, each enabling pulse allowing each electrical signal source and said second microphone means to transmit its outputs when receiving an enabling pulse; and a bus conducting all outputs from said plurality of electrical signal sources and said second microphone means;

a second audio frequency amplifier producing an output signal by receiving and amplifying said second set of electrical impulses received from said bus;

a radio frequency oscillator producing said radio frequency carrier signal;

an FM modulator receiving and using said output signal from said second audio frequency amplifier to produce a frequency modulated carrier signal by frequency modulating said radio frequency carrier signal from said radio frequency oscillator with said output signal from second audio frequency amplifier;

an AM modulator producing said AM/FM signal by amplitude-modulating said frequency-modulated carrier signal from said FM modulator, with said AM modulating signal received from said first audio frequency amplifier; and a transmitter means receiving and transmitting said AM/FM signal from said AM modulator said transmitter means thereby transmitting said first and said plurality of second intelligence signals simultaneously over a single radio frequency.

3. A radio communication system as defined in claim 2, wherein said sequence and timing distributor comprises:

a frequency divider receiving said AM modulating signal from said first audio frequency amplifier and producing an output signal, output signal having a frequency of 1/n multiplied by the frequency of said AM modulating signal where n is a number equalling the sum of all electrical signal sources, including said second microphone means, which receive an enabling pulse from said sequence and timing distributor;

a third audio frequency amplifier producing an output signal by receiving and amplifying the output signal produced by said frequency divider; and a phase splitter receiving and splitting said output signal from said third amplifier and producing said plurality of enabling pulses by splitting said output signal from said third amplifier n times, said phase splitter sequentially sending an enabling pulse to each of said plurality of electrical signal sources, including said second microphone means.

4. A radio communication system as defined in claim 2, wherein said plurality of electrical signal sources are four in number and said sequence and timing distributor comprises:

a first, second, third and fourth AND gate, each having a first and second input, and each AND gate outputting an enabling pulse to one of said plurality of electrical signal sources;

a frequency divider receiving said AM modulating signal from said first audio frequency amplifier, and producing an output signal by dividing said AM modulating signal in half, said output signal of said frequency divider having a frequency of one half the frequency of said AM modulating signal;

a first amplifier producing an output signal by receiving and amplifying said output signal from said frequency divider;

a first transmitter phase splitter receiving said output signal from said first amplifier and producing a first and second square wave output signal at one half the frequency of said AM modulating signal, said first and second square wave output signals being 180° out of phase with each other, said first square wave output signal being sent to said first and third AND gates as their first input, and said second square wave output signal being sent to said second and fourth AND gates as their first input;

a very low frequency oscillator producing an output signal sychronized with, and at one fourth the frequency of said AM modulating signal;

a second amplifier producing an output signal from said very low frequency oscillator;

a limiter producing a third square wave output by receiving and limiting said output signal from said second amplifier;

and a second transmitter phase splitter producing a fourth and fifth square wave output signal at one fourth the frequency of said AM modulating signal; said fourth and fifth square wave signals being 180° out of phase with each other, said fourth square wave output signal being sent to said first and second AND gates as their second input, and said fifth square wave output signal being sent to said third and fourth AND gates as their second input.

5. A radio communication system having an AM/FM simulcast receiver capable of receiving first and second intelligence signals simultaneously over a single frequency, said AM/FM simulcast receiver comprising:

a receiver means receiving an AM/FM signal, said AM/FM signal containing said first intelligence signal which was used to frequency-modulate a radio frequency carrier into a frequency-modulated carrier, said simulcast AM/FM signal containing said second intelligence signal, which was used to amplitude-modulate said frequency-modulated carrier;

an AM detector receiving and amplitude-demodulating said AM/FM signal from said receiver means and separating said second intelligence signal and said frequency-modulated carrier;

a first audio frequency receiver amplifier producing an output signal by receiving and amplifying said second intelligence signal from said AM detector;

an AM speaker means outputting said second intelligence signal by receiving and processing said output signal from said first audio frequency receiver amplifier;

a first radio frequency amplifier producing an output signal by receiving and amplifying said frequency-modulated carrier from said AM detector;

a limiter producing a square-wave output by receiving and limiting said output signal from said first radio frequency amplifier;

an FM discriminator producing an output signal by receiving and frequency-demodulating said output signal from said limiter;

a second audio frequency receiving amplifier producing an output signal by receiving and amplifying said output signal from said FM discriminator; and an FM speaker means outputting said first intelligence signal by receiving and processing said output signal from said second audio frequency receiver.

* * * * *